United States Patent
Shah et al.

(10) Patent No.: US 10,630,644 B2
(45) Date of Patent: Apr. 21, 2020

(54) MANAGING FIREWALL FLOW RECORDS OF A VIRTUAL INFRASTRUCTURE

(71) Applicant: NICIRA, INC., Palo Alto, CA (US)

(72) Inventors: Shadab Shah, Fremont, CA (US);
Kaushal Bansal, Pleasanton, CA (US);
Uday Masurekar, Sunnyvale, CA (US);
Jerry Pereira, Santa Clara, CA (US);
Sunitha Krishna, Saratoga, CA (US)

(73) Assignee: Nicira, Inc., Palo Alto, CA (US)

( * ) Notice: Subject to any disclaimer, the term of this patent is extended or adjusted under 35 U.S.C. 154(b) by 171 days.

(21) Appl. No.: 15/380,885

(22) Filed: Dec. 15, 2016

(65) Prior Publication Data
US 2018/0176183 A1 Jun. 21, 2018

(51) Int. Cl.
*H04L 29/06* (2006.01)

(52) U.S. Cl.
CPC ...... *H04L 63/0263* (2013.01); *H04L 63/0254* (2013.01); *H04L 63/1425* (2013.01)

(58) Field of Classification Search
CPC .............. H04L 63/0263; H04L 63/029; H04L 63/0218
See application file for complete search history.

(56) References Cited

U.S. PATENT DOCUMENTS

| | | | | |
|---|---|---|---|---|
| 2009/0249472 A1* | 10/2009 | Litvin et al. | ........ | H04L 63/0263 726/14 |
| 2011/0154471 A1 | 6/2011 | Anderson et al. | | |
| 2014/0164619 A1* | 6/2014 | Zhu | ........ | G06F 9/45558 709/226 |
| 2015/0213075 A1* | 7/2015 | Collinge | ........ | H04L 63/0236 709/213 |
| 2015/0372977 A1 | 12/2015 | Yin | | |
| 2016/0359705 A1* | 12/2016 | Parandehgheibi | .. | H04L 63/1425 |

OTHER PUBLICATIONS

Luo et al., Practical flow table aggregation in SDN, Sep. 2015, Elsevier, pp. 1-17 (Year: 2015).*

* cited by examiner

*Primary Examiner* — Ellen Tran

(57) ABSTRACT

In a computer-implemented method for managing firewall flow records, firewall flow records of a virtual infrastructure including a distributed firewall are received, wherein the firewall flow records are captured according to firewall rules of the distributed firewall, and wherein the firewall flow records each include tuples and at least one field of network traffic data. Responsive to detecting a number of received firewall flow records exceeding a threshold value, it is determined whether the tuples are identical for any of the firewall flow records. Provided the tuples are not identical for any of the firewall flow records, the tuples for the firewall flow records are modified to generate modified firewall flow records. It is determined whether the tuples are identical for any of the modified firewall flow records. Provided the tuples are identical for any of the modified firewall flow records, the modified firewall flow records for which the tuples are identical are coalesced into a single firewall flow record.

27 Claims, 8 Drawing Sheets

400

| | Tuples | | | | Network Traffic Data | | |
|---|---|---|---|---|---|---|---|
| SRC_IP | DEST_IP | SRC_PORT | DEST_PORT | PROTOCOL | BYTES | PACKETS | SESSIONS |
| 192.160.1.1 | 10.1.1.1 | 3189 | 80 | TCP | 2 | 5 | 1 |
| 192.160.1.1 | 10.1.1.1 | 3289 | 80 | TCP | 3 | 2 | 1 |
| 192.160.1.2 | 10.1.1.1 | 3389 | 80 | TCP | 3 | 1 | 1 |
| 192.160.1.3 | 10.1.1.1 | 3789 | 80 | TCP | 4 | 5 | 1 |

410
412
414
416

420

| | Tuples | | | | Network Traffic Data | | |
|---|---|---|---|---|---|---|---|
| SRC_IP | DEST_IP | SRC_PORT | DEST_PORT | PROTOCOL | BYTES | PACKETS | SESSIONS |
| 192.160.1.1 | 10.1.1.1 | 0 | 80 | TCP | 5 | 7 | 2 |
| 192.160.1.2 | 10.1.1.1 | 0 | 80 | TCP | 3 | 1 | 1 |
| 192.160.1.3 | 10.1.1.1 | 0 | 80 | TCP | 4 | 5 | 1 |

422
414
416

430

| | Tuples | | | | Network Traffic Data | | |
|---|---|---|---|---|---|---|---|
| SRC_IP | DEST_IP | SRC_PORT | DEST_PORT | PROTOCOL | BYTES | PACKETS | SESSIONS |
| 192.160.1.0 | 10.1.1.1 | 0 | 80 | TCP | 12 | 13 | 4 |

MANAGING FIREWALL FLOW RECORDS OF A VIRTUAL INFRASTRUCTURE

BACKGROUND

Distributed software firewalls (also referred to herein as distributed firewalls) allow for increased granularity of firewall control. In general, distributed firewalls provide network access control at the data end node level rather than a centralized choke point. For instance, distributed firewalls can be implemented as a virtual network interface card (vNIC) level firewall. For example, vNIC level firewalls are able to enforce security policies as soon as a packet comes out of a virtual machine's (VM's) vNIC. Therefore, distributed firewalls are able to provide security for intra-VM traffic. VNIC level firewalls can also inspect the traffic twice, once at source and once at destination.

Distributed firewalls also generate firewall flow records associated with communication sessions over a particular vNIC. The firewall flow records are generated by the packets passing through an Internet protocol (IP) based forwarding engine of the distributed firewall at the hypervisor level. A firewall flow records represent packets transmitted to the distributed firewall.

BRIEF DESCRIPTION OF DRAWINGS

The accompanying drawings, which are incorporated in and form a part of the Description of Embodiments, illustrate various embodiments of the subject matter and, together with the Description of Embodiments, serve to explain principles of the subject matter discussed below. Unless specifically noted, the drawings referred to in this Brief Description of Drawings should be understood as not being drawn to scale. Herein, like items are labeled with like item numbers.

FIG. 4 shows example management of firewall flow records, in accordance with various embodiments.

DESCRIPTION OF EMBODIMENTS

Figure 1:
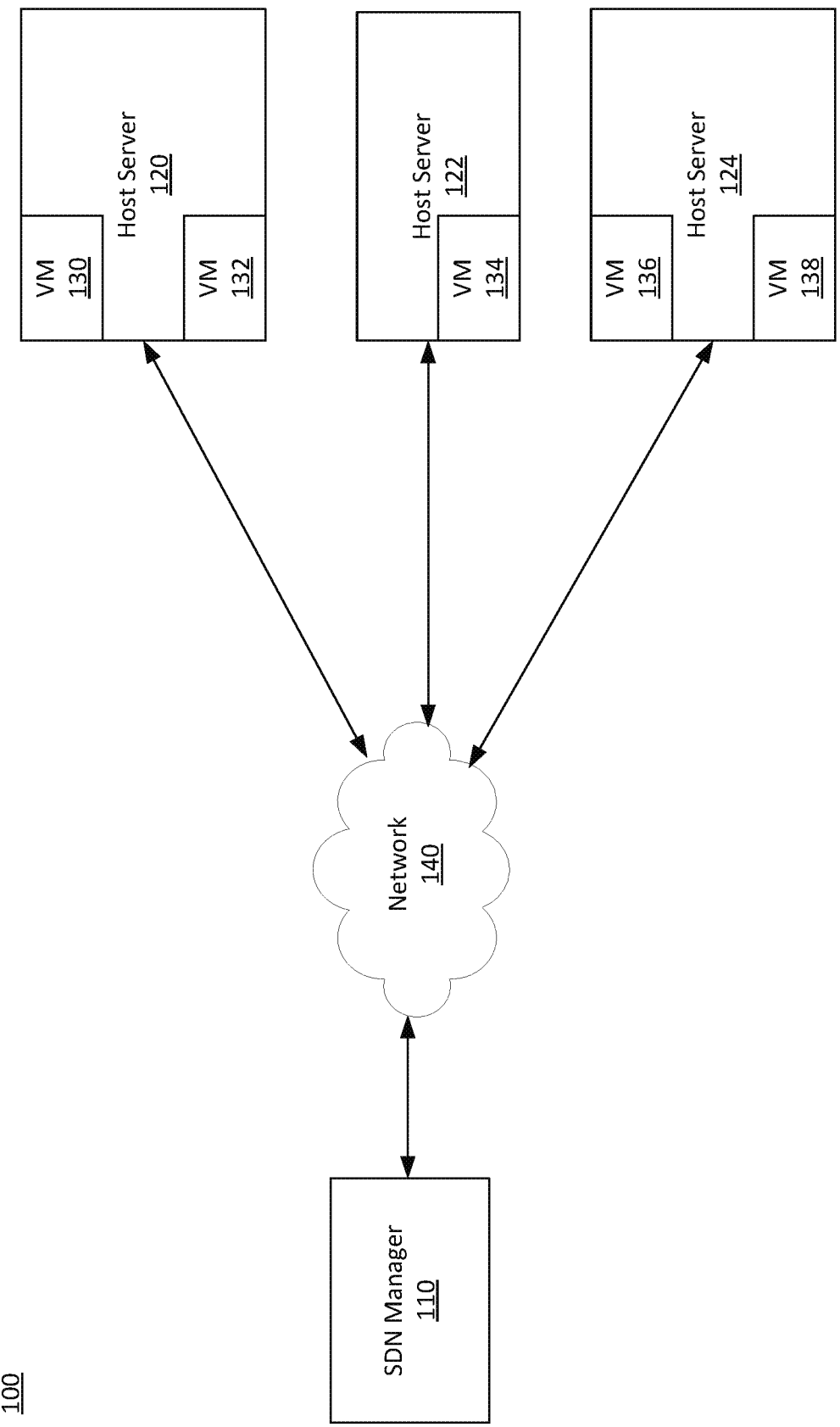
FIG. 1 shows an example network architecture upon which embodiments of the present invention can be implemented.

Reference will now be made in detail to various embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Notation and Nomenclature

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be one or more self-consistent procedures or instructions leading to a desired result. The procedures are those requiring physical manipulations of physical quantities. Usually, although not necessarily, these quantities take the form of electrical or magnetic signals capable of being stored, transferred, combined, compared, and otherwise manipulated in an electronic device.

It should be borne in mind, however, that all of these and similar terms are to be associated with the appropriate physical quantities and are merely convenient labels applied to these quantities. Unless specifically stated otherwise as apparent from the following discussions, it is appreciated that throughout the description of embodiments, discussions utilizing terms such as "collecting," "receiving," "processing," "adapting," "decompressing," "decrypting," "pushing," "coalescing," "evaluating," "detecting," "modifying," "determining," "performing," "removing," "replacing," "repeating," or the like, refer to the actions and processes of an electronic computing device or system such as: a host processor, a processor, a memory, a hyper-converged appliance, a software defined network (SDN) manager, a virtualization management server or a virtual machine (VM), among others, of a virtualization infrastructure or a computer system of a distributed computing system, or the like, or a combination thereof. The electronic device manipulates and transforms data represented as physical (electronic and/or magnetic) quantities within the electronic device's registers and memories into other data similarly represented as physical quantities within the electronic device's memories or registers or other such information storage, transmission, processing, or display components.

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example mobile electronic device described herein may include components other than those shown, including well-known components.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, perform one or more of the methods described herein. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors, such as one or more motion processing units (MPUs), sensor processing units (SPUs), host processor(s) or core(s) thereof, digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structures or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of an SPU/MPU and a microprocessor, a plurality of microprocessors, one or more microprocessors in conjunction with an SPU core, MPU core, or any other such configuration.

Overview of Discussion

Example embodiments described herein improve the performance of computer systems by improving the collection and management of firewall flow records in a virtualized environment using a distributed firewall.

In accordance with some embodiments, firewall flow records are received from a plurality of data end nodes of a virtualized infrastructure including a distributed firewall according to a collection schedule. The firewall flow records are captured according to firewall rules of the distributed firewall. The collection schedule defines which data end nodes of the plurality of data end nodes from which firewall flow records are collected, a frequency of collection of firewall flow records from the data end nodes, and an amount of firewall flow records collected from the data end nodes. Firewall flow records received at a firewall flow record collection queue are processed, such that the received firewall flow records are prepared for storage at a flow record data store. The collection schedule is dynamically adapted based at least in part on the processing of the received firewall flow records, such that the firewall flow record collection queue is available for processing firewall flow records prior to receiving additional firewall flow records from the data end nodes from which the firewall flow records are collected.

In accordance with some embodiments, firewall flow records of a virtual infrastructure including a distributed firewall are received. The firewall flow records are captured according to firewall rules of the distributed firewall. The firewall flow records each include a plurality of tuples and at least one field of network traffic data. Responsive to detecting a number of received firewall flow records exceeding a threshold value, it is determined whether the tuples are identical for any of the firewall flow records. Provided the tuples are not identical for any of the firewall flow records, the tuples for the firewall flow records are modified to generate modified firewall flow records. It is determined whether the tuples are identical for any of the modified firewall flow records. Provided the tuples are identical for any of the modified firewall flow records, the modified firewall flow records for which the tuples are identical are coalesced into a single firewall flow record.

In virtualized environments (e.g., virtual networks) implementing distributed firewall, firewall flow records of network communications transmitted through the distributed firewall are generated. Generally, firewall flow records provide information describing the operation and type of data of the managed system. These firewall flow records can provide for flow monitoring of the virtualized environment. For example, the firewall flow records can be analyzed to determine whether the distributed firewall is operating properly. Firewall flow records may be used to determine whether virtual machines (VMs) are operating properly. Furthermore, the firewall flow records may be used to assist in planning for creating firewall rules. There are many other potential uses of firewall flow records as a system analysis tool.

For many types of virtualized environments implementing distributed firewalls, software defined networking (SDN) managers, such as VMware Inc.'s NSX Manager, are used to manage operations. SDN managers provide configuration management for components (e.g., hosts, virtual servers, VMs, data end nodes, etc.) of the virtualized environment. Accordingly, SDN managers do not typically include large persistent data stores for storing massive quantities of firewall flow records for offline analysis. However, firewall flow records are an effective tool in monitoring network performance. Accordingly, the collection and management of the firewall flow records can benefit from improved management of the firewall flow records, to provide for analysis of the network performance based on firewall flow records while optimizing the available resources of the SDN manager.

Firewall flow records are generated by the packets passing through a distributed firewall at the hypervisor level. The collected firewall flow records can be allowed or blocked flows and can contain network traffic data such as packet count and byte count for the flow session allowed by the firewall rule. These firewall flow records are further collected in the SDN manager. For example, this operation can be used as a Day-2 operation representing the historical aspect of the traffic flowing through the virtual network. The firewall flow record collection is self-sustaining and uses a heuristic-based graceful degradation mechanism to provide feedback to different processes of the system to adapt and change the collection schedule based on how the firewall flow records are received. As the whole system is based on the limited resources of the SDN manager, in various embodiments, the firewall flow record collection is distributed at hypervisor level which can invoke controlled lossy aggregation to lose the granularity in the firewall flow records if the hypervisor also is approaching resource limits.

Example System for Collecting and Managing Firewall Flow Records

Example embodiments described herein provide systems and methods for collecting and managing firewall flow records generated at a distributed firewall. In accordance with some embodiments, firewall flow records are received from a plurality of data end nodes of a virtualized infrastructure including a distributed firewall according to a collection schedule. The firewall flow records are captured according to firewall rules of the distributed firewall. The collection schedule defines which data end nodes of the plurality of data end nodes from which firewall flow records are collected, a frequency of collection of firewall flow records from the data end nodes from which the firewall flow records are collected, and an amount of firewall flow records collected from the data end nodes from which the firewall flow records are collected. Firewall flow records received at a firewall flow record collection queue are processed, such that the received firewall flow records are prepared for storage at a flow record data store. The collection schedule is dynamically adapted based at least in part on the processing of the received firewall flow records, such that the firewall flow record collection queue is available for processing firewall flow records prior to receiving additional firewall flow records from the data end nodes from which the firewall flow records are collected.

In accordance with some embodiments, firewall flow records of a virtual infrastructure including a distributed firewall are received. The firewall flow records are captured according to firewall rules of the distributed firewall. The firewall flow records each include a plurality of tuples and at least one field of network traffic data. Responsive to detecting a number of received firewall flow records exceeding a threshold value, it is determined whether the tuples are identical for any of the firewall flow records. Provided the tuples are not identical for any of the firewall flow records, the tuples for the firewall flow records are modified to generate modified firewall flow records. It is determined whether the tuples are identical for any of the modified firewall flow records. Provided the tuples are identical for any of the modified firewall flow records, the modified firewall flow records for which the tuples are identical are coalesced into a single firewall flow record.

FIG. 1 shows an example virtualization infrastructure 100 upon which embodiments of the present invention can be implemented. Virtualization infrastructure 100 may be used, for example, to provide hardware virtualization enterprise services. Virtualization infrastructure 100 includes various network nodes working in tandem to provide virtualization. As illustrated, virtualization infrastructure 100 includes SDN manager 110, host servers 120, 122 and 124 (also referred to as "hosts" or "virtual servers"), and virtual machines (VMs) 130, 132, 134, 136 and 138. It should be appreciated that virtualization infrastructure 100 may include any number of virtualization SDN managers, host servers and VMs, and that the number of components shown in FIG. 1 is for illustrative purposes only. Moreover, it should be appreciated that virtualization infrastructure 100 may include other components, such as datacenters, and is not intended to be limited to the illustrated embodiment.

Virtualization infrastructure 100 is communicatively coupled to network 140. It should be appreciated that network 140 may be any type of communication network, such as, and without limitation, a local intranet, an extranet, and the Internet. As illustrated, SDN manager 110 and host servers 120, 122 and 124 of virtualization infrastructure 100 are communicatively coupled via network 140. In various embodiments, VMs 130, 132, 134, 136 and 138 are communicatively coupled to network 140. In accordance with the described embodiments, network 140 provides packet-based communication using the Internet Protocol (IP).

It should be appreciated that while the embodiments described herein recite that VMs of host servers are the data end nodes facilitating network communication and enforcement of firewall rules, it should be appreciated that different types of data end nodes can be used in different embodiments. Examples of such data end nodes include VMs and non-VM addressable nodes (e.g., volume mounters (iSCSI mounter, NFS mounter, etc.), VM migrators (e.g., vMotion module used in the ESX hypervisor of VMware Inc.), and hypervisor kernel network interface (e.g., vmknic of VMware Inc.)). For each data end node, or for a set of data end nodes, the distributed firewall (DFW) in some embodiments generate custom firewall data storages (e.g., firewall rule tables) based on the received firewall rules.

In accordance with various embodiments, a distributed firewall utilized on virtualization infrastructure 100 to monitor and control traffic flow to and from network 140. A distributed firewall is embedded as a service within the hypervisor level, wherein all participating hypervisors operate collectively as a firewall. Management of the distributed firewall (e.g., creation and propagation of firewall rules) can be managed by a central manager, such as SDN manager 110.

Figure 2:
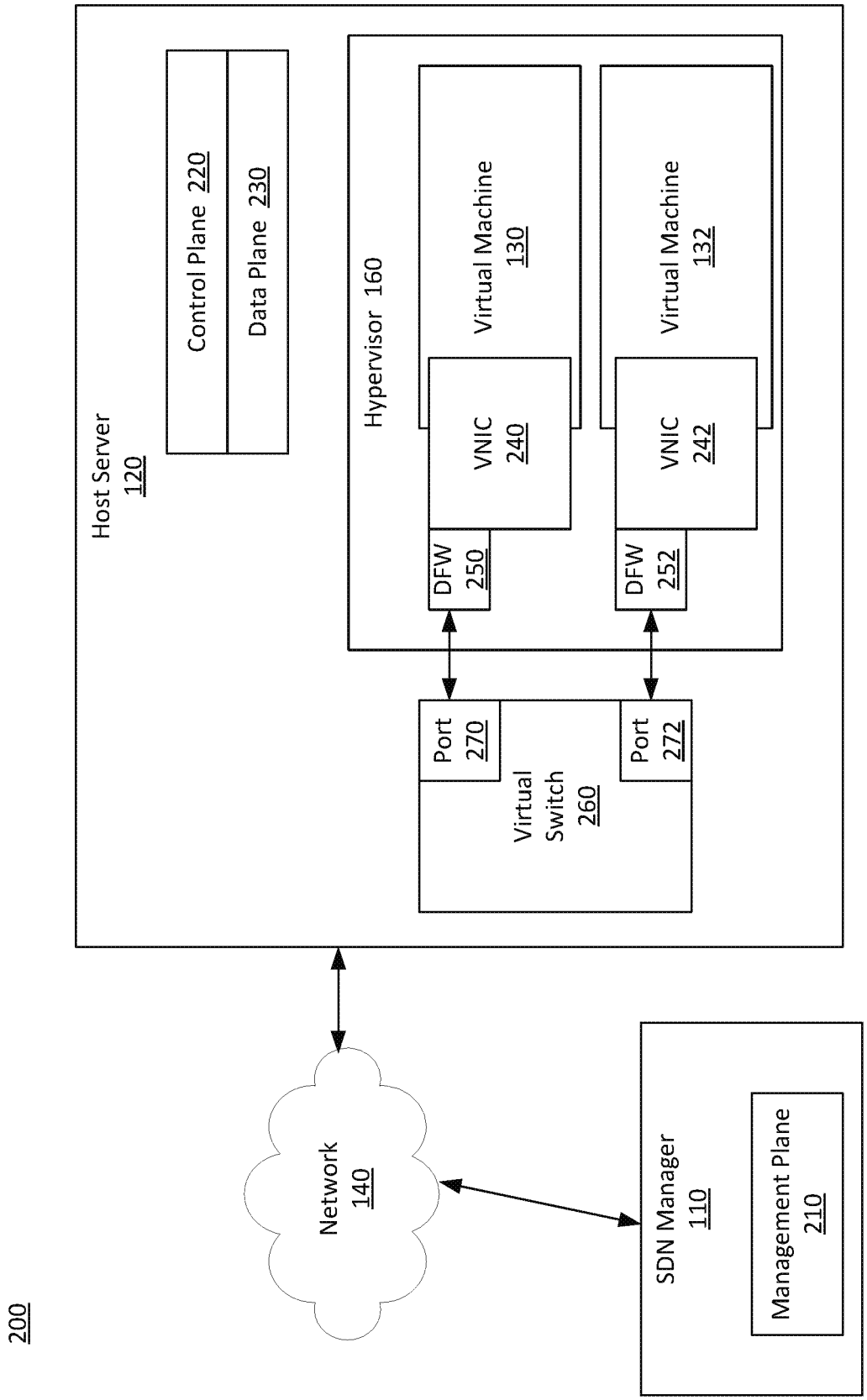
FIG. 2 shows an example distributed firewall over a virtual network, in accordance with various embodiments.

FIG. 2 shows an example distributed firewall over a virtual network 200, in accordance with various embodiments. As illustrated, virtual network 200 includes SDN manager 110, host server 120, VM 130, VM 132, and network 140. It should be appreciated that various components from FIG. 1 are not illustrated in FIG. 2 so as to not obfuscate the principles of operation of the described embodiments, and that the distributed firewall can be implemented in all data end nodes of FIG. 1. In some embodiments, the VMs execute on top of hypervisor 160 that is executing on host server 120. FIG. 2 illustrates just two VMs 130 and 132, but a larger number of VMs execute on the host server 120 in some cases. Each VM may belong to one tenant or to multiple tenants when the host operates in a multi-tenant environment.

As illustrated, VM 130 includes vNIC 240 and VM 132 includes vNIC 242. It should be appreciated that the VMs can include any number of vNICs. A distributed firewall is located between each vNIC and the respective port of virtual switch 260. As illustrated, distributed firewall (DFW) component 250 is communicatively coupled with vNIC 240 and port 270 and DFW component 252 is communicatively coupled with vNIC 242 and port 272. DFW components 250 and 252 are for enforcing the firewall rules of the distributed firewall. In various embodiments, host server 120 receives firewall rules from SDN manager 110 or another firewall management node (not illustrated) and, based on these rules, perform vNIC-level firewall operations on packets sent by, and received for, VMs 130 and 132.

Each vNIC of the VM is responsible for exchanging packets between the VM and the virtual switch 260. As further described below, each VNIC connects to a particular port of the virtual switch 260, which connects to a physical network interface card (NIC) (not shown) for communicatively coupling with network 140. In some embodiments, the vNICs are software abstractions of a physical NIC that are implemented by hypervisor 160. In some embodiments, the virtual switch 260 and the DFW components 250 and 252 operate in the kernel space. It should be appreciated that a host server can include one or more virtual switches, and that these virtual switches can be designated on a cluster basis, depending on the implementation.

In some embodiments, the virtual switch 260 maintains a single port for each vNIC of each VM. For instance, for vNICs 240 and 242, the virtual switch 260 includes ports 270 and 272, respectively. The virtual switch 260 performs packet-processing operations to forward packets that it receives on one of its ports to another one of its ports. For example, in some embodiments, the virtual switch 260 tries to use data in the packet (e.g., data in the packet header) to match a packet to flow based rules, and upon finding a match, to perform the action specified by the matching rule. In some embodiments, the virtual switch 260 connects to a physical NIC (through a NIC driver (not shown)) to send outgoing packets and to receive incoming packets. In some embodiments, the virtual switch 260 is defined to include a port (not shown) that connects to the physical NIC's driver to send and receive packets to and from the NIC.

Also, in some embodiments, the virtual switch 260 of one host server can form multiple virtual switches with virtual switches of other host servers, with each virtual switch serving a conceptual switch that services a virtual network. In other words, different virtual switches can be defined to specify different virtual networks for different users, and each virtual switch can be defined by multiple software switches on multiple hosts.

In some embodiments, the ports of the virtual switch 260 include one or more function calls to one or more modules that implement special input/output operations on incoming and outgoing packets that are received at the ports. One of these function calls is to the distributed firewall component, which performs in some embodiments firewall operations on incoming and/or outgoing packets (e.g., on packets that are received by the host for one of the VMs or on packets that are sent by one of the VMs).

The distributed firewall can be called (e.g., by a port 270 or 272 of the virtual switch 260) for incoming or outgoing packets to check whether such packets should be delivered to a VM or sent from a VM based on vNIC-level firewall rules. In some embodiments, the distributed firewall component can be called by the port that connects to the physical NIC's driver (e.g., for incoming packets).

The distributed firewall tries to match the received packets' identifiers (e.g., five-tuple identifiers extracted from the packet header) with the associated identifiers (e.g., five-tuple identifiers) of the firewall rules associated with the vNIC that is the destination of an incoming packet or the source of an outgoing packet. In other words, to match a rule with a packet, the distributed firewall identifies n-data tuples for a packet (e.g., extracts these tuples from the packet's header) and compares the identified tuples with the n-data tuples of each rule.

The distributed firewall generates firewall flow records associated with communication sessions over a particular vNIC. The firewall flow records are generated by the packets passing through an Internet Protocol (IP) based forwarding engine of the distributed firewall at the hypervisor level. For example, a packet engine on the hypervisor collects the firewall flow records for transmission to the SDN manager. A firewall flow record represents packets transmitted through the distributed firewall and includes information such as packet count and byte count for the flow session allowed by the firewall rule.

In various embodiments, a firewall flow record is generated when a packet (e.g., traffic going in and out of a vNIC) reaches the distributed firewall. Based on the firewall rule, the action is to allow the traffic or to block. In one embodiment, all the allowed flows are kept in the kernel until the TCP session continues. Once a session is stopped the associated firewall flow record is collected in the control plane 220. In one embodiment, the control plane 220 only keeps the allowed firewall flow records. In another embodiment, all firewall flow records are kept.

The control plane 220 is where the firewall flow records are stored until the SDN manager 110 pulls them. In one embodiment, only allowed firewall flow records are stored in control plane 220. In another embodiment, all firewall flow records (blocked and allowed) are stored in control plane 220. In accordance with some embodiments, control plane 220 is configured to aggregate the firewall flow records according to a coalescing logic if the number of firewall flow records exceeds a threshold value. Control plane 220 may be configured to convert and compress the firewall flow records into a different format and transport the firewall flow records to SDN manager 110 using messaging architecture. In some embodiments, control plane 220 may be configured to encrypt the firewall flow records into a different format and transport the firewall flow records to SDN manager 110.

In various embodiments, the collected firewall flow records can be associated with allowed and/or blocked flows. Firewall flow records include tuples for identifying the packet or packet(s) associated with the firewall flow record. In one embodiment, the firewall flow records include the following five data tuples: source IP address, destination IP address, source port, destination port, and the protocol used, also indicated as:

SRC_IP, DEST_IP, SRC_PORT, DEST_PORT, PROTOCOL

In another embodiment, the firewall flow records include the following eight tuples: action, source IP address, destination IP address, vNIC universally unique identifier (UUID), protocol, direction, destination port, and rule ID, also indicated as:

ACTION, SRC_IP, DEST_IP, VNIC UUID, PROTOCOL, DIR, DEST_PORT, RULE_ID

It should be appreciated that these tuples are examples, and that any number of tuples as well as other tuples, such as security groups, service identifiers, and timestamps (e.g., STARTTIME and ENDTIME), may be used as well. The firewall flow records also include network traffic data fields including the number of bytes, the number of packets and the number of sessions associated with each firewall flow records, indicated as:

BYTES, PACKETS, SESSIONS

In various embodiments the number of bytes may include separate fields for the bytes received and bytes sent and the number of packets may include separate fields for packets received and packets sent. The network traffic data fields may be indicated as:

IN_BYTES, OUT_BYTES, IN_PACKETS, OUT_PACKETS, SESSIONS

It should be appreciated that network traffic data fields are examples, and that other network traffic data may be used as well.

Virtual network 200, using host server 120 and SDN manager 110, operates to collect and manage firewall flow records. In one embodiment, management plane 210 resident in SDN manager 110 and control plane 220 and data plane 230 resident in host server 120 operate in conjunction to collect and manage firewall flow records. Management plane 210 is the centralized network management component of the SDN. Management plane 210 provides for management of firewall rules, management of all connected host servers, management of IP Flow Information Export (IPFIX) data, as well as many other management operations. For example, the management plane 210 may provide a REST API entry point, a graphical user interface for controlling virtual network 200, performing network health checks, etc.

Management plane 210 includes a message bus agent that assists in managing communication between management plane 210, control plane 220 and data plane 230. The mode of communication among the SDN manager 110 and the hypervisor(s) is an asynchronous based messaging system. The SDN manager 110 sends a flow collection message in a publish-subscribe model based on topics. All the hypervisors generally tune them to multiple topics. The control plane 220 also acts as a messaging client and puts the flow data on the message bus using a remote procedure call (RPC) mechanism. The RPC allows the SDN manager 110 to collect the firewall flow records from the host server 120 for collection in a firewall flow record collection queue of SDN manager 110. Data plane 230 operates to collect the firewall flow records according to the direction of control plane 220 (e.g., according to the firewall rules).

In accordance with various embodiments, firewall flow record collection at control plane 220 and management plane 210 is designed in a self-sustaining manner which uses a heuristic-based graceful degradation mechanism to provide feedback to different processes of the SDN manager 110 to adapt and change the collection schedule of the firewall flow records. In some embodiments, as the virtual network 200 is based on the limited resources of the SDN manager, the firewall flow collection is distributed at control plane 220 which invokes controlled lossy aggregation technique to lose the granularity in the firewall flow records if SDN manager 110 approaches operational limitations.

As described above, firewall flow records are generated at the hypervisor level and collected in control plane 220. Due to limited resources in the SDN manager 110, SDN manager 110 might not be able to frequently pull the data from the hypervisor so the firewall flow records keep on aggregating at the hypervisor. If it is determined that the threshold value of firewall flow records that can be stored in the hypervisor is exceeded, the hypervisor can initiate the controlled lossy aggregation technique described below. It should be appreciated that the controlled lossy aggregation technique can be initiated without the threshold value of firewall flow records being exceeded, and that such an embodiment is an example. For example, in various embodiments, the controlled lossy aggregation technique can be initiated periodically or on demand.

Embodiments herein provide for heuristic-based graceful degradation of firewall flow records to control the loss of information by aggregating duplicate information and for deliberately controlling the manner in which granularity is lost. In other words, the described embodiments prove for predetermining the relative importance of information within the tuples of the firewall flow records and for allowing that which is less important to be lost first as necessary by available resources. Various factors can impact the heuristic-based graceful degradation such as:

the size of the deployment: e.g., the number of vNICs and the number of hypervisors;
the nature of the workload: e.g., chatty web servers, density of these web servers on a single hypervisor, etc.; and
a resource utilization pattern: the SDN manager has resource constraints and will likely be serving to other configurations.

As the whole collection is based on constrained system the time to process the same amount of data across multiple collection cycle might vary as well.

In various embodiments, SDN manager 110 supports the export of firewall flow records for analysis. The firewall flow records may be in IPFIX format, another known format, or a proprietary format. For instance, SDN manager 110 collects the firewall flow records because the context for a particular firewall flow record (e.g., the associated firewall rule) and the relationships of the contexts of the data is present in the SDN manager 110. For example, context refers to the firewall rule which has generated the firewall flow record, the particular VM which has generated the firewall flow record. Context may also refer to a relationship of the VM to the security groups, virtual networks, and/or security policy to which it is related. Furthermore, data compression can be implemented at the data end points (e.g., the flow collector module in the control plane 220 and the flow collector module in management plane 210) to improve data transmission.

Figure 3:
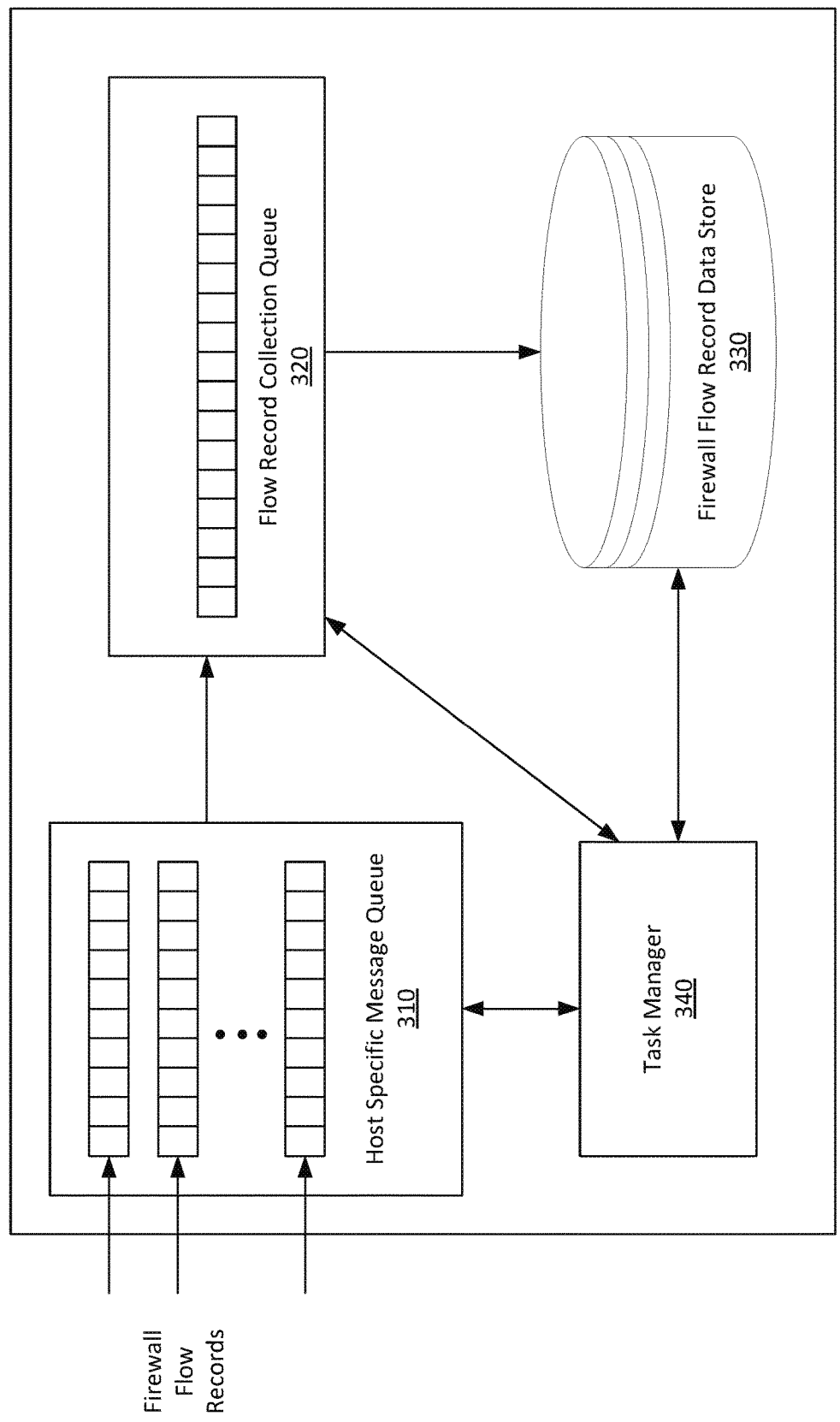
FIG. 3 shows an example software defined network (SDN) manager, in accordance with various embodiments.

FIG. 3 shows an example SDN manager 110 for collecting and managing firewall flow records, in accordance with various embodiments. Firewall flow records are collected in management plane 210 by using a pull mechanism from all the hypervisors managed by SDN manager 110. Task manager 340 controls the operation of the following described task of SDN manager 110. In accordance with the various embodiments, task manager 340 is operable to execute the following tasks:

a flow collection scheduling task;
a flow collection task;
a flow persistence task; and
a purge task.

SDN manager is configured to process the received firewall flow records, such that the firewall flow records are prepared for storage in a persistent data store.

Task manager 340 is configured to initiate a firewall flow records collection scheduling task. The collection scheduling task uses a collection schedule to collect the firewall flow records. The collection schedule defines which data end nodes from which firewall flow records are collected, a frequency of collection of firewall flow records from the data end nodes from which the firewall flow records are collected, and an amount of firewall flow records collected from the data end nodes from which the firewall flow records are collected. As described herein, the collection schedule can be dynamically adapted to minimize data loss based on system resources.

In one embodiment, the periodicity of a collection cycle of the collection schedule can be adapted, where the periodicity defines the frequency of firewall flow record collection from the data end nodes. For example, initially the system starts with a fixed period of collection interval. Based on the resource constraints and resource utilization the periodicity can change. For example, the system starts with a default periodicity of five minutes, which is adapted based on the feedback from the other components in the system to change the periodicity of the collection cycle.

In one embodiment, the span of the collection cycle of the collection schedule can be adapted, where the span defines which data end nodes of the available data end nodes from which firewall flow records are collected. For example, initially the span could be all data end nodes of the system. The SDN manager might or might not be able to handle the all the firewall flow records in a single collection cycle based on the size of the number of data end nodes. For example, if the SDN manager is not able to handle all data end nodes, after certain number of collection cycles, the firewall flow records can be quantified based on hypervisors and clusters and the span of the collection can be changed from all data end nodes to cluster-based collection including clusters of data end nodes.

In one embodiment, the collection pattern of the collection schedule can be adapted. In some embodiments, the SDN manager is configured to evaluate data end nodes from which firewall flow records are collected according to the firewall flow records collected (e.g., how the firewall flow records are collected). For example, after few collection cycles the SDN manager can start grading each vNIC and/or hypervisor in terms of how many firewall flow records they are generating and rank the vNICs, hypervisors, clusters, etc., based on grading. Depending on the overall convergence of the process the SDN manager can start collecting more often from data end nodes generating more firewall flow records. In some embodiments, the collection of more firewall flow records from some data end nodes, or more frequently from some data end nodes, depends on resource availability.

In one embodiment, the firewall flow records collection scheduling task is a daemon thread in the SDN manager 110 which sends a message to all hypervisors from which firewall flow records are to be collected to transmit collected firewall flow records. Once received, the hypervisors will start sending firewall flow record messages on the RPC queue. In various embodiments, the scheduling task degrades gracefully based on the resources (e.g., processing time, processing capacity, memory) SDN manager 110 is taking to process the collected firewall flow records.

For example, SDN manager 110 initially utilizes a periodic poll of 5 minutes. If SDN manager is not able to process collected firewall flow records within 5 minutes, for example due to limited resources, the periodic poll time can be increased. The following factors are examples that could impact the adaption of the periodic poll time, and would update the collection schedule accordingly:

Collection pattern: firewall flow records can be collected from all data end nodes, collection can be cluster-based, or collection can be host-based.

Collection queue size: The size of the firewall flow record collection queue available to store the data that has been received from the hypervisors.

Purge Task: Firewall flow records in the persistent data store should not be purged prior to collection of a new collection cycle.

Task manager 340 is also configured to initiate a firewall flow records collection task. The firewall flow records are received at host specific message queue 310, where the firewall flow records for each host server are collected into a separate portion of host specific message queue 310. The firewall flow records collection task takes the firewall flow records from host specific message queue 310 as soon as the data is available and places the firewall flow records in firewall flow records collection queue 320. In order to avoid dropping firewall flow records due to lack of space in firewall flow records collection queue 320, SDN manager 110 will adapt the collection schedule to avoid dropping firewall flow records prior to placement in a persistent data store. For instance, SDN manager can adapt the collection schedule to change at least one of 1) which data end nodes from which firewall flow records are collected, 2) a frequency of collection of firewall flow records from the data end nodes from which the firewall flow records are collected, and 3) an amount of firewall flow records collected from the data end nodes from which the firewall flow records are collected.

Task manager 340 is also configured to initiate a firewall flow records persistence task. The firewall flow records persistence task includes reading the firewall flow records collection queue 320 and pushing the firewall flow records to firewall flow record data store 330. In various embodiments, the firewall flow records persistence task is operable to perform various processing operations on the firewall flow records. For instance, and without limitation, the firewall flow records persistence task is operable to: dequeue the message including the firewall flow record from the firewall flow records collection queue 320; decrypt and/or decompress the message (if needed); convert the message from binary to the domain model; and to persist the firewall flow records in firewall flow record data store 330.

Data of firewall flow record data store 330, including firewall flow records, may be used to provide information describing the operation and type of data of the managed system. These firewall flow records can provide for flow monitoring of the virtualized environment. For example, the firewall flow can be analyzed by SDN manager 110 or another component to determine whether the distributed firewall is operating properly. Firewall flow records may be used to determine whether virtual machines (VMs) are operating properly. Furthermore, the firewall flow records may be using to assist in planning for creating firewall rules.

Task manager 340 is also configured to initiate a purge task. The purge task is operable to reduce the number of records in the firewall flow record data store 330 by a controlled lossy aggregation technique. In one embodiment, the controlled lossy aggregation technique is managed to minimize data loss by managing how data from firewall flow records is lost. In one embodiment, the controlled lossy aggregation is initiated responsive to determining that the number of firewall flow records in the firewall flow record data store 330 exceeds a threshold value of firewall flow records. In one embodiment, the threshold value is less than the actual capacity of the firewall flow record data store 330.

For example, if the actual capacity of firewall flow record data store 330 is two million firewall flow records (e.g., after which no more firewall flow records can be received), the threshold value might be 1.5 million. In other words, the threshold value is set such that the controlled lossy aggregation is initiated prior to running out of space in firewall flow record data store 330.

In one embodiment, responsive to detecting a number of stored firewall flow records exceeding a threshold value, it is determined whether the tuples are identical for any of the firewall flow records. It should be appreciated that the purge task may be initiated independent of the number of firewall flow records exceeding a threshold value. For example, in various embodiments, the purge task can be initiated periodically or on demand. Provided the tuples are not identical for any of the firewall flow records, the tuples for the firewall flow records are modified to generate modified firewall flow records. It is determined whether the tuples are identical for any of the modified firewall flow records. Provided the tuples are identical for any of the modified firewall flow records, the modified firewall flow records for which the tuples are identical are coalesced into a single firewall flow record.

Modification of the tuples for firewall flow records allows for coalescence of multiple firewall flow records into a single firewall flow record. For example, some of the information contained within the firewall flow records might be less important than other information. By modifying the tuples of the firewall flow records, it is possible to coalesce the more important information into fewer firewall flow records, thus allowing for the optimization of available firewall flow record storage. In accordance with various embodiments, the SDN manager is configured to control the modification of the tuples of the firewall flow records. The following are examples of how the firewall flow records can be modified to allow for coalescence of firewall flow records with identical tuples:

Losing dynamic port information—For dynamic protocols (e.g., FTP), the firewall flow records generated at the distributed firewall include dynamic port information, which can be stored at the SDN manager (e.g., as the source port or the destination port). Dynamic protocols use a random data port and thus no firewall rules can be written using the dynamic port information. In one embodiment, the SDN manager ignores the port information for dynamic ports (e.g., modifies the tuples to remove the dynamic port information). The SDN manager will thus ignore these ports allowing the firewall flow record information to be kept as a single firewall flow record based on a control port.

Losing the self IP address (vNIC)—During operation, a VM/vNIC can change its IP address and still connect to the same set of remote servers. In such a case, duplicate firewall flow records are created where vNIC IP addresses are different (e.g., the source IP address or the destination IP address). In one embodiment, the SDN manager ignores the vNIC IP address (e.g., modifies the tuples to remove the vNIC IP address). The SDN manager will thus ignore the vNIC IP addresses of the tuples, allowing the firewall flow record information to be kept as a single firewall flow record.

Losing destination port information—In one embodiment, the SDN manager can modify the firewall flow records such that the destination port information is removed from the tuples. For example, if a server is hosting multiple services, the SDN manager will remove the destination port from the firewall flow records such that the firewall flow records only store the VM to server communication data and protocol.

Converting non-vNIC IP address to network—For multi-tenant use cases, where each tenant is on a different network, the non-vNIC IP address can be converted to a network address. For example, a network administrator might desire to keep only network based communication and define rules based on these networks. In such a case, in some embodiments, firewall flow records for different vNICs on the same network can converted such that the non-vNIC IP address can be converted to a network address. Thus, the SDN manager can coalesce the firewall flow records into single firewall flow records if they are taking to same remote server (e.g. Address Resolution Protocol (ARP), Dynamic Host Configuration Protocol (DHCP), Active Directory (AD)) requests.

VM(s) security group conversion—In some cases, multiple VMs may be included into security groups. In such cases, the tuples of the firewall flow records can be modified such that the vNIC information identifies a security group rather than the vNIC. Thus, the SDN manager can coalesce the firewall flow records going in/out of an identified security group into a single firewall flow record.

FIG. 4 shows example management of firewall flow records, in accordance with various embodiments. Table 400 includes four firewall flow records 410, 412, 414 and 416. The firewall flow records include five tuples (SRC_IP, DEST_IP, SRC_PORT, DEST_PORT, PROTOCOL) and three fields of network traffic data (BYTES, PACKETS, SESSIONS). It should be appreciated that different tuples and fields of network traffic data can be used, and that the tuples and fields of network traffic data are examples. Moreover, while FIG. 4 illustrates examples of coalescing firewall flow records, the assumption that a threshold value has been exceeded is made so as to provide an illustrative example of the coalescing of the firewall flow records.

For purposes of this example, it is assumed that the threshold value has been exceeded. As illustrated in FIG. 4, the tuples for firewall flow records 410, 412, 414 and 416 are not identical. That is, the SRC_PORT tuple is different for each firewall flow record. In one embodiment, a hash operation on the tuples is performed for each of the firewall flow records. Based on the hash operation, it is determined whether the tuples for any of the firewall flow records are identical based on the hash operation. For instance, as the firewall flow records are not identical, the hash operation would indicate that none of the firewall flow records are identical.

As no flow records have been coalesced at this point, the controlled lossy aggregation technique modifies the tuples, and then determines whether any of the firewall flow records with modified tuples are identical. In one embodiment, the modification of the tuples is performed according to a predetermined hierarchy, where the order of modification of the tuples and the type of modification of the tuples is predefined. In the illustrated embodiment, the tuples of table 400 are first modified to remove and/or replace the SRC_PORT tuple with a null value. Such a modification allows for the coalescing of firewall flow records for which the only differentiating information is the SRC_PORT information. It is then determined whether any of the modified firewall flow records include identical tuples (e.g., the firewall flow records are hashed.) By changing the SRC_PORT value for each firewall flow record to zero, it is determined that firewall flow records 410 and 412 are identical (e.g., the remaining tuples are all identical).

As shown in table 420, firewall flow records 410 and 412 have been coalesced into a single firewall flow record 422, where the network traffic data fields have been aggregated so that the network traffic data is not lost. For example, firewall flow record 410 includes 2 bytes, 5 packets and 1 session, and firewall flow record 412 includes 3 bytes, 2 packets and 1 session. Therefore, firewall flow record 422 includes 5 bytes, 7 packets and 2 sessions, which is the aggregated total of the two firewall flow records. Accordingly, table 420 now includes three firewall flow records rather than the four firewall flow records of table 400.

For purposes of this example, it is assumed that the threshold value has been exceeded for table 420. As illustrated in table, the tuples for firewall flow records 414, 416 and 422 are not identical. That is, the SRC_IP tuple is different for each firewall flow record. In one embodiment, a hash operation on the tuples is performed for each of the firewall flow records. Based on the hash operation, it is determined whether the tuples for any of the firewall flow records are identical based on the hash operation. For instance, as the firewall flow records are not identical, the hash operation would indicate that none of the firewall flow records are identical.

As no flow records have been coalesced at this point and the threshold value is assumed exceeded, the controlled lossy aggregation technique modifies the tuples, and then determines whether any of the firewall flow records with modified tuples are identical. In one embodiment, predetermined hierarchy defines that the SRC_IP tuple be modified for each firewall flow record. In the illustrated embodiment, the tuples of table 420 are modified to modify the subnet of the SRC_IP tuple. It is then determined whether any of the modified firewall flow records include identical tuples (e.g., the firewall flow records are hashed.) By modifying the subnet of the SRC_IP value for each firewall flow record to zero, it is determined that firewall flow records 414, 416 and 422 are identical (e.g., the remaining tuples are all identical). Such a modification allows for the coalescing of firewall flow records for which the only differentiating information is the SRC_IP information.

As shown in table 430, firewall flow records 414, 416 and 422 have been coalesced into a single firewall flow record 432, where the network traffic data fields have been aggregated so that the network traffic data is not lost. For example, firewall flow record 432 includes 12 bytes, 13 packets and 4 sessions, which is the aggregated total of firewall flow records 414, 416 and 422. Accordingly, table 430 now includes one firewall flow record rather than the three firewall flow records of table 400.

In other embodiments, the controlled lossy aggregation technique is referred to as a multi-bucket hash algorithm and initial bucket size of tuples (e.g., five tuples) is selected. As the controlled lossy aggregation technique requires execution (e.g., the threshold has been exceeded), the number of buckets is reduced.

As described above, firewall flow records are generated at the hypervisor level and collected in control plane 220. Due to limited resources in the SDN manager 110, SDN manager 110 might not be able to frequently pull the data from the hypervisor so the firewall flow records keep on aggregating at the hypervisor. If it is determined that the threshold value of firewall flow records that can be stored in the hypervisor is exceeded, the hypervisor can implement the controlled lossy aggregation technique described above in accordance with FIG. 4.

Example Methods of Operation

Figure 5A:
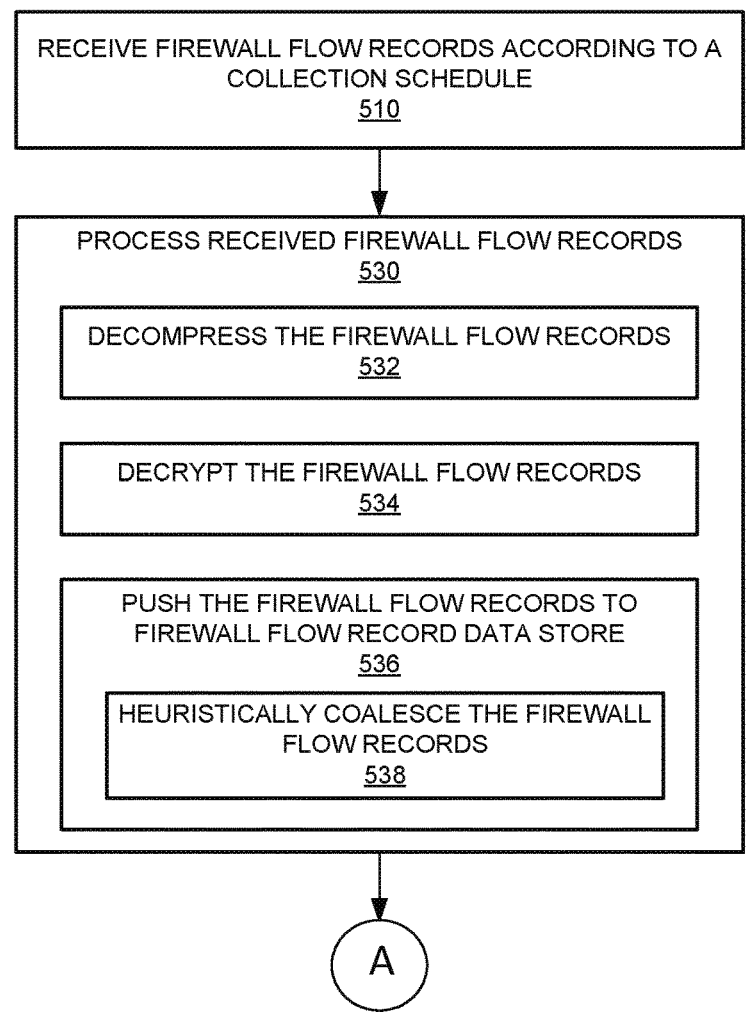
FIGS. 5A and 5B illustrate a flow diagram of an example method for collecting firewall flow records, according to various embodiments.
Figure 5B:
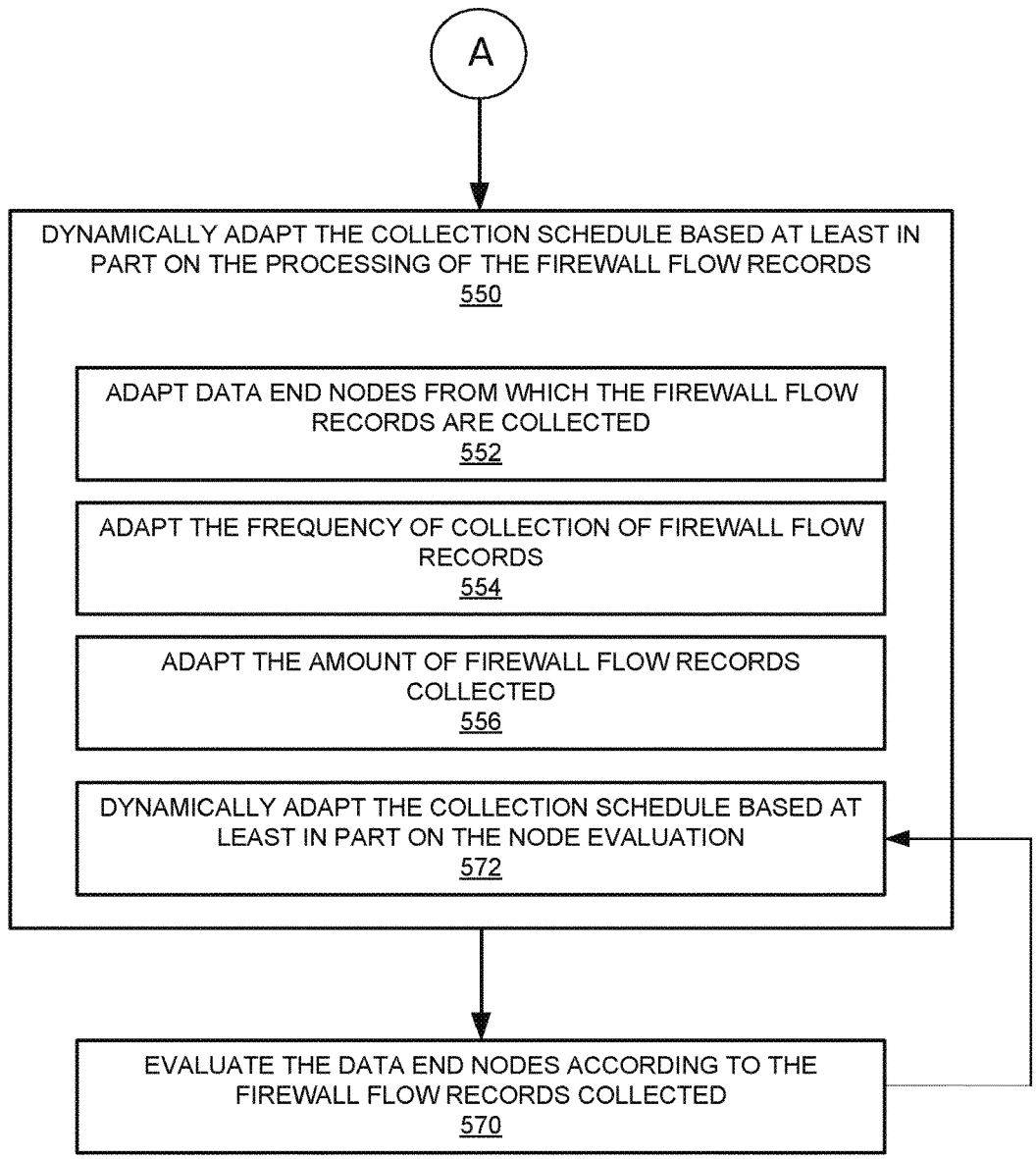

FIGS. 5A and 5B shows a flow diagram 500 of an example method for collecting firewall flow records, in accordance with various embodiments. Procedures of this method will be described with reference to elements and/or components of FIGS. 1, 2 and 3. It is appreciated that in some embodiments, the procedures may be performed in a different order than described, that some of the described procedures may not be performed, and/or that one or more additional procedures to those described may be performed. Flow diagram 500 includes some procedures that, in various embodiments, are carried out by one or more processors under the control of computer-readable and computer-executable instructions that are stored on non-transitory computer-readable storage media. It is further appreciated that one or more procedures described in flow diagram 500 may be implemented in hardware, or a combination of hardware with firmware and/or software At procedure 510, the SDN manager receives firewall flow records from a plurality of data end nodes of a virtualized infrastructure (e.g., virtualization infrastructure 100 of FIG. 1 and virtual network 200 of FIG. 2) comprising a distributed firewall according to a collection schedule, wherein the firewall flow records are captured according to firewall rules of the distributed firewall. The collection schedule defines which data end nodes of the plurality of data end nodes from which firewall flow records are collected, a frequency of collection of firewall flow records from the data end nodes from which the firewall flow records are collected, and an amount of firewall flow records collected from the data end nodes from which the firewall flow records are collected. In one embodiment, the plurality of data end nodes are configured to enable at least one VM (e.g., VM 130), wherein the at least one VM is configured to enable at least one vNIC (e.g., vNIC 240), wherein the firewall rules are enforced at the at least one vNIC.

At procedure 530, the SDN manager processes the firewall flow records received at a firewall flow record collection queue (e.g., firewall flow record collection queue 320), such that the SDN manager prepares the received firewall flow records for storage at a flow record data store. In one embodiment, as shown at procedure 532, the SDN manager decompresses received firewall flow records into an uncompressed format. In one embodiment, as shown at procedure 534, the SDN manager decrypts the received firewall flow records. In one embodiment, as shown at procedure 536, the SDN manager pushes received firewall flow records to the firewall flow record data store (e.g., firewall flow record data store 330). In one embodiment, as shown at procedure 538, the SDN manager heuristically coalesces firewall flow records in the firewall flow record data store (e.g., according to the controlled lossy coalescence described above).

With reference to FIG. 5B, at procedure 550 of flow diagram 500, the SDN manager dynamically adapts the collection schedule based at least in part on the processing of the received firewall flow records, such that the firewall flow record collection queue is available for processing firewall flow records prior to receiving additional firewall flow records from the data end nodes from which the firewall flow records are collected. In one embodiment, as shown at procedure 552, the SDN manager adapts the data end nodes of the plurality of data end nodes from which firewall flow records are collected. In one embodiment, as shown at procedure 554, the SDN manager adapts the frequency of collection of firewall flow records from the data end nodes from which the firewall flow records are collected. In one embodiment, as shown at procedure 556, the SDN manager adapts the amount of firewall flow records collected from the data end nodes from which the firewall flow records.

In one embodiment, as shown at procedure 570, the SDN manager evaluates the data end nodes from which firewall flow records are collected according to the firewall flow records collected. Flow diagram 500 then proceeds to procedure 572, where the SDN manager dynamically adapts the collection schedule based at least in part on the evaluation of data ends nodes. In one embodiment, the collection schedule is heuristically adapted based at least in part on data end nodes from which firewall flow records are collected and a size of the firewall flow record collection queue.

Figure 6:
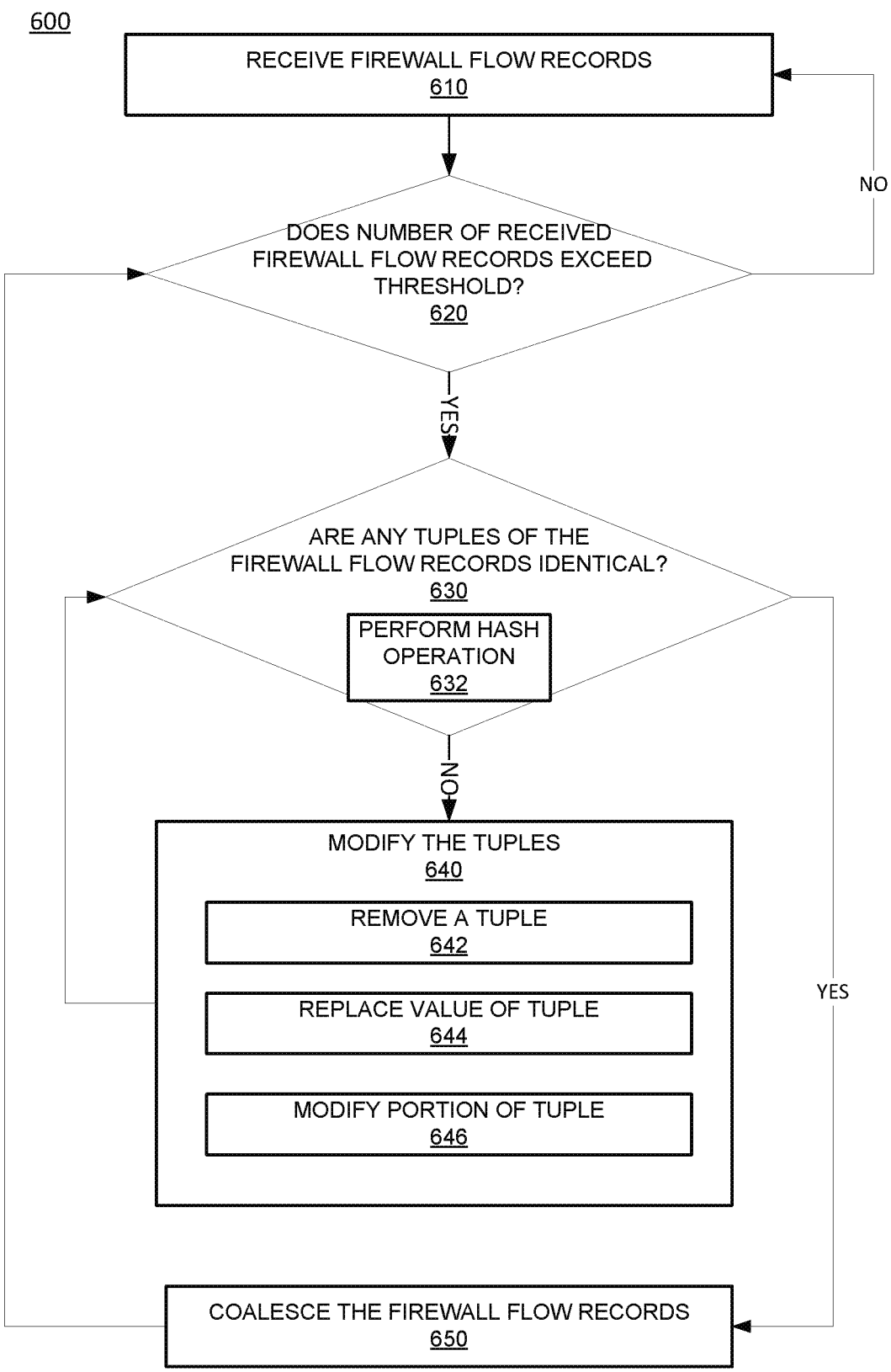
FIG. 6 illustrates a flow diagram of an example method for managing firewall flow records, according to various embodiments.

FIG. 6 shows a flow diagram 600 of an example method for managing firewall flow records, in accordance with various embodiments. In one embodiment, flow diagram 600 is executed at an SDN manager (e.g., SDN manager 110 of FIGS. 1, 2 and 3). In another embodiment, flow diagram 600 is executed at a host server (e.g., host server 120 of FIGS. 1 and 2). It is appreciated that in some embodiments, the procedures may be performed in a different order than described, that some of the described procedures may not be performed, and/or that one or more additional procedures to those described may be performed. Flow diagram 600 includes some procedures that, in various embodiments, are carried out by one or more processors under the control of computer-readable and computer-executable instructions that are stored on non-transitory computer-readable storage media. It is further appreciated that one or more procedures described in flow diagram 600 may be implemented in hardware, or a combination of hardware with firmware and/or software At procedure 610, firewall flow records of a virtual infrastructure including a distributed firewall are received, wherein the firewall flow records are captured according to firewall rules of the distributed firewall, and wherein the firewall flow records each include a plurality of tuples and at least one field of network traffic data. In one embodiment, the at least one field of network traffic data comprises a bytes field, a packets field, and a sessions field.

At procedure 620, it is determined whether a number of received firewall flow records exceeds a threshold value. In one embodiment, the threshold value is less than an actual capacity of firewall flow records that can be received. If the number of received firewall flow records does not exceed the threshold value, flow diagram 600 returns to procedure 610. If the number of received firewall flow records does exceed the threshold value, flow diagram 600 proceeds to procedure 630.

At procedure 630, it is determined whether the tuples are identical for any of the firewall flow records. In one embodiment, as shown at procedure 632, a hash operation is performed on the tuples for each of the firewall flow records. The determination that the tuples are identical for any of the firewall flow records may be based on the hash operation. If the tuples are identical for any of the firewall flow records, flow diagram 600 returns to procedure 650. If the tuples are not identical for any of the firewall flow records, flow diagram 600 proceeds to procedure 640.

At procedure 640, the tuples for the firewall flow records are modified to generate modified firewall flow records. In one embodiment, the tuples are ranked according to a predetermined hierarchy, such that the tuples are modified according to the predetermined hierarchy. In one embodiment, as shown at procedure 642, a tuple is removed from the tuples for each of the firewall flow records. In one embodiment, as shown at procedure 644, a value of tuple is replaced with a null value for each of the firewall flow records. In one embodiment, as shown at procedure 646, a portion of a tuple is modified for each of the firewall flow records. Flow diagram 600 then returns to procedure 620.

At procedure 650, provided the tuples are identical for any of the modified firewall flow records, the modified firewall flow records for which the tuples are identical are coalesced into a single firewall flow record. In one embodiment, the at least one field of network traffic data of the modified firewall flow records is coalesced into the single firewall flow record.

It should be appreciated that, in accordance with various embodiments, responsive to a number of the firewall flow records exceeding the threshold value, procedures 630, 640 and 650 are repeated until the number of firewall flow records does not exceed the threshold value.

Example Computer System Environment

Figure 7:
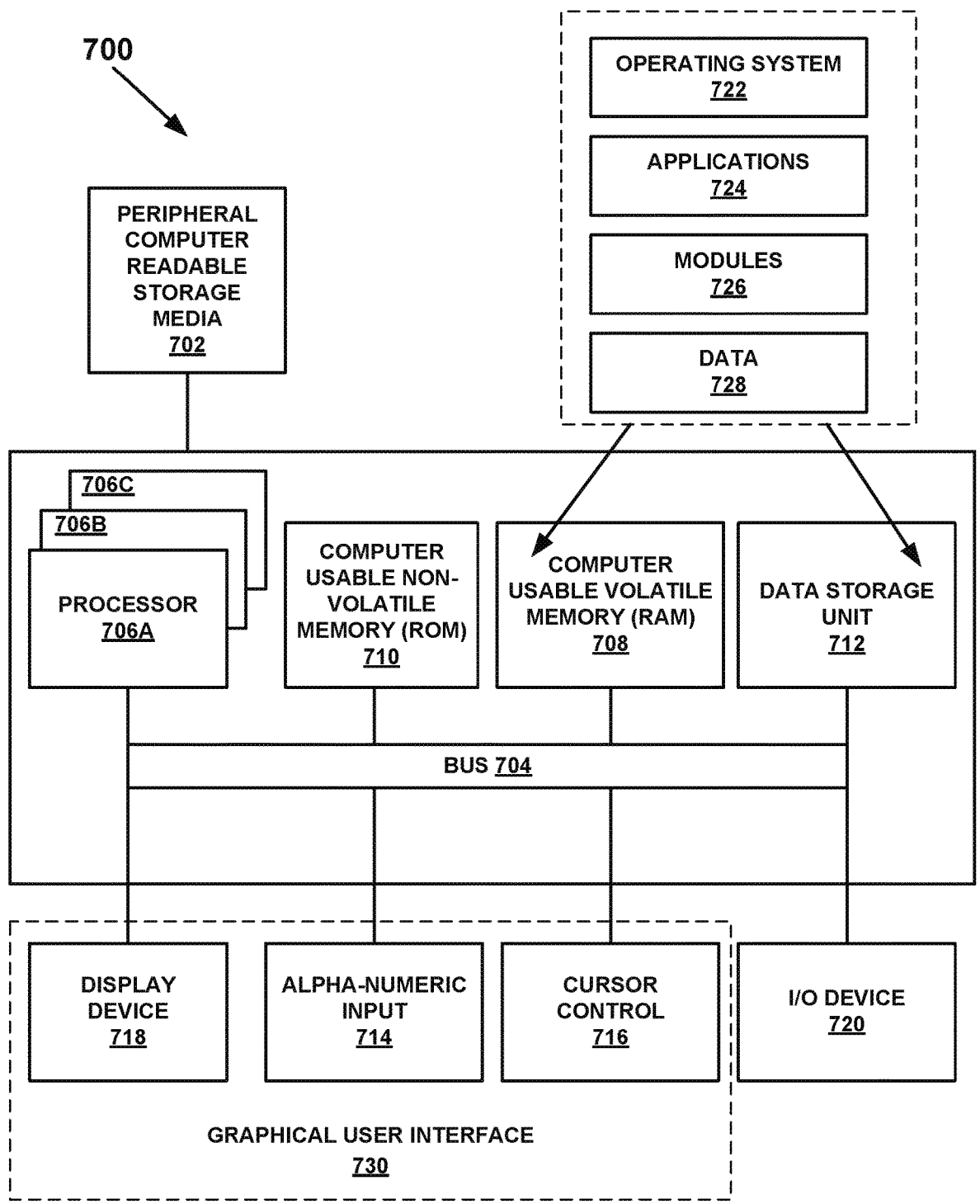
FIG. 7 shows an example computer system upon which embodiments of the present invention can be implemented.

With reference now to FIG. 7, all or portions of some embodiments described herein are composed of computer-readable and computer-executable instructions that reside, for example, in computer-usable/computer-readable storage media of a computer system. That is, FIG. 7 illustrates one example of a type of computer (computer system 700) that can be used in accordance with or to implement various embodiments which are discussed herein. It is appreciated that computer system 700 of FIG. 7 is only an example and that embodiments as described herein can operate on or within a number of different computer systems including, but not limited to, general purpose networked computer systems, embedded computer systems, routers, switches, server devices, client devices, various intermediate devices/nodes, stand alone computer systems, media centers, handheld computer systems, multi-media devices, hyper-converged appliances, virtual machines, virtualization management servers, and the like. Computer system 700 of FIG. 7 is well adapted to having peripheral tangible computer-readable storage media 702 such as, for example, an electronic flash memory data storage device, a floppy disc, a compact disc, digital versatile disc, other disc based storage, universal serial bus "thumb" drive, removable memory card, and the like coupled thereto. The tangible computer-readable storage media is non-transitory in nature.

System 700 of FIG. 7 includes an address/data bus 704 for communicating information, and a processor 706A coupled with bus 704 for processing information and instructions. As depicted in FIG. 7, system 700 is also well suited to a multi-processor environment in which a plurality of processors 706A, 706B, and 706C are present. Conversely, system 700 is also well suited to having a single processor such as, for example, processor 706A. Processors 706A, 706B, and 706C may be any of various types of microprocessors. System 700 also includes data storage features such as a computer usable volatile memory 708, e.g., random access memory (RAM), coupled with bus 704 for storing information and instructions for processors 706A, 706B, and 706C. System 700 also includes computer usable non-volatile memory 710, e.g., read only memory (ROM), coupled with bus 704 for storing static information and instructions for processors 706A, 706B, and 706C. Also present in system 700 is a data storage unit 712 (e.g., a magnetic or optical disc and disc drive) coupled with bus 704 for storing information and instructions. System 700 also includes an alphanumeric input device 714 including alphanumeric and function keys coupled with bus 704 for communicating information and command selections to processor 706A or processors 706A, 706B, and 706C. System 700 also includes an cursor control device 716 coupled with bus 704 for communicating user input information and command selections to processor 706A or processors 706A, 706B, and 706C. In one embodiment, system 700 also includes a display device 718 coupled with bus 704 for displaying information.

Referring still to FIG. 7, display device 718 of FIG. 7 may be a liquid crystal device (LCD), light emitting diode display (LED) device, cathode ray tube (CRT), plasma display device, a touch screen device, or other display device suitable for creating graphic images and alphanumeric characters recognizable to a user. Cursor control device 716 allows the computer user to dynamically signal the movement of a visible symbol (cursor) on a display screen of display device 718 and indicate user selections of selectable items displayed on display device 718. Many implementations of cursor control device 716 are known in the art including a trackball, mouse, touch pad, touch screen, joystick or special keys on alphanumeric input device 714 capable of signaling movement of a given direction or manner of displacement. Alternatively, it will be appreciated that a cursor can be directed and/or activated via input from alphanumeric input device 714 using special keys and key sequence commands. System 700 is also well suited to having a cursor directed by other means such as, for example, voice commands. In various embodiments, alphanumeric input device 714, cursor control device 716, and display device 718, or any combination thereof (e.g., user interface selection devices), may collectively operate to provide a graphical user interface (GUI) 730 under the direction of a processor (e.g., processor 706A or processors 706A, 706B, and 706C). GUI 730 allows user to interact with system 700 through graphical representations presented on display device 718 by interacting with alphanumeric input device 714 and/or cursor control device 716.

System 700 also includes an I/O device 720 for coupling system 700 with external entities. For example, in one embodiment, I/O device 720 is a modem for enabling wired or wireless communications between system 700 and an external network such as, but not limited to, the Internet.

Referring still to FIG. 7, various other components are depicted for system 700. Specifically, when present, an operating system 722, applications 724, modules 726, and data 728 are shown as typically residing in one or some combination of computer usable volatile memory 708 (e.g., RAM), computer usable non-volatile memory 710 (e.g., ROM), and data storage unit 712. In some embodiments, all or portions of various embodiments described herein are stored, for example, as an application 724 and/or module 726 in memory locations within RAM 708, computer-readable storage media within data storage unit 712, peripheral computer-readable storage media 702, and/or other tangible computer-readable storage media.

CONCLUSION

The examples set forth herein were presented in order to best explain, to describe particular applications, and to thereby enable those skilled in the art to make and use embodiments of the described examples. However, those skilled in the art will recognize that the foregoing description and examples have been presented for the purposes of illustration and example only. The description as set forth is not intended to be exhaustive or to limit the embodiments to the precise form disclosed. Rather, the specific features and acts described above are disclosed as example forms of implementing the claims.

Reference throughout this document to "one embodiment," "certain embodiments," "an embodiment," "various embodiments," "some embodiments," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics of any embodiment may be combined in any suitable manner with one or more other features, structures, or characteristics of one or more other embodiments without limitation.

What is claimed is:

1. A computer-implemented method for managing firewall flow records, the method comprising:
   receiving firewall flow records of a virtual infrastructure comprising a distributed firewall, wherein the firewall flow records are captured according to firewall rules of the distributed firewall, and wherein the firewall flow records each comprise tuples and at least one field of network traffic data;
   responsive to detecting a number of received firewall flow records exceeding a threshold value, determining whether the tuples are identical for any of the firewall flow records;
   provided the tuples are not identical for any of the firewall flow records, modifying the tuples for the firewall flow records by removing information from the tuples to generate modified firewall flow records to reduce granularity of the tuples, wherein the tuples are modified according to a predetermined hierarchy;
   determining whether the tuples are identical for any of the modified firewall flow records; and
   provided the tuples are identical for any of the modified firewall flow records, coalescing the modified firewall flow records for which the tuples are identical into a single firewall flow record.

2. The method of claim 1, further comprising:
   provided the tuples are identical for any of the firewall flow records, coalescing the firewall flow records for which the tuples are identical into a single firewall flow record.

3. The method of claim 1, wherein the determining whether the tuples are identical for any of the firewall flow records comprises:
   performing a hash operation on the tuples for each of the firewall flow records; and
   determining whether the tuples for any of the firewall flow records are identical based on the hash operation.

4. The method of claim 1, wherein the modifying the tuples for the firewall flow records to generate modified firewall flow records comprises:
   removing a tuple from the tuples for each of the firewall flow records.

5. The method of claim 1, wherein the modifying the tuples for the firewall flow records to generate modified firewall flow records comprises:
   replacing a value for a tuple of the tuples with a null value for each of the firewall flow records.

6. The method of claim 1, wherein the modifying the tuples for the firewall flow records to generate modified firewall flow records comprises:
   modifying a portion of a tuple of the tuples for each of the firewall flow records.

7. The method of claim 1, determining whether the tuples are identical for any of the modified firewall flow records comprises:

performing a hash operation on the tuples for each of the modified firewall flow records; and determining whether the tuples for any of the modified firewall flow records are identical based on the hash operation.

8. The method of claim 1, wherein the threshold value is less than an actual capacity of firewall flow records that can be received.

9. The method of claim 1, further comprising:

responsive to a number of the modified firewall flow records exceeding the threshold value, modifying the tuples for the modified firewall flow records to generate second modified firewall flow records;

determining whether the tuples are identical for any of the second modified firewall flow records; and provided the tuples are identical for any of the second modified firewall flow records, coalescing the second modified firewall flow records for which the tuples are identical into a single firewall flow record.

10. The method of claim 1, further comprising:

responsive to a number of the modified firewall flow records exceeding the threshold value, repeating the modifying the tuples for the modified firewall flow records, determining whether the tuples are identical for any of the modified firewall flow records, and coalescing the modified firewall flow records for which the tuples are identical into a single firewall flow record.

11. The method of claim 1, wherein the coalescing the modified firewall flow records for which the tuples are identical into a single firewall flow record comprises:

coalescing the at least one field of network traffic data of the modified firewall flow records into the single firewall flow record.

12. The method of claim 1, wherein the at least one field of network traffic data comprises a bytes field, a packets field, and a sessions field.

13. The method of claim 1, wherein the receiving firewall flow records of the virtual infrastructure comprising the distributed firewall comprises:

receiving the firewall flow records at a management node of the virtual infrastructure from distributed firewall components of a plurality of data end nodes of the virtual infrastructure.

14. The method of claim 13, further comprising:

storing the firewall flow records at a data store of the management node.

15. The method of claim 14, wherein the storing the firewall flow records at a data store of the management node comprises:

storing the firewall flow within a table maintained at the data store of the management node.

16. A non-transitory computer readable storage medium having computer readable program code stored thereon for causing a computer system to perform a method for managing firewall flow records, the method comprising:

receiving firewall flow records of a virtual infrastructure comprising a distributed firewall, wherein the firewall flow records are captured according to firewall rules of the distributed firewall, and wherein the firewall flow records each comprise tuples and at least one field of network traffic data;

responsive to detecting a number of received firewall flow records exceeding a threshold value, determining whether the tuples are identical for any of the firewall flow records;

provided the tuples are identical for any of the firewall flow records, coalescing the firewall flow records for which the tuples are identical into a single firewall flow record provided the tuples are not identical for any of the firewall flow records, modifying the tuples for the firewall flow records by removing information from the tuples to generate modified firewall flow records to reduce granularity of the tuples, wherein the tuples are modified according to a predetermined hierarchy;

determining whether the tuples are identical for any of the modified firewall flow records; and provided the tuples are identical for any of the modified firewall flow records, coalescing the modified firewall flow records for which the tuples are identical into a single firewall flow record.

17. The non-transitory computer readable storage medium of claim 16, wherein the modifying the tuples for the firewall flow records to generate modified firewall flow records comprises:

removing a tuple from the tuples for each of the firewall flow records.

18. The non-transitory computer readable storage medium of claim 16, wherein the modifying the tuples for the firewall flow records to generate modified firewall flow records comprises:

replacing a value for a tuple of the tuples with a null value for each of the firewall flow records.

19. The non-transitory computer readable storage medium of claim 16, wherein the modifying the tuples for the firewall flow records to generate modified firewall flow records comprises:

modifying a portion of a tuple of the tuples for each of the firewall flow records.

20. The non-transitory computer readable storage medium of claim 16, the method further comprising:

responsive to a number of the modified firewall flow records exceeding the threshold value, modifying the tuples for the modified firewall flow records to generate second modified firewall flow records;

determining whether the tuples are identical for any of the second modified firewall flow records; and provided the tuples are identical for any of the second modified firewall flow records, coalescing the second modified firewall flow records for which the tuples are identical into a single firewall flow record.

21. The non-transitory computer readable storage medium of claim 16, the method further comprising:

responsive to a number of the modified firewall flow records exceeding the threshold value, repeating the modifying the tuples for the modified firewall flow records, determining whether the tuples are identical for any of the modified firewall flow records, and coalescing the modified firewall flow records for which the tuples are identical into a single firewall flow record.

22. A computer system comprising:

a non-transitory data storage unit; and a hardware processor coupled with the non-transitory data storage unit, the processor configured to:

receive firewall flow records of a virtual infrastructure comprising a distributed firewall, wherein the firewall flow records are captured according to firewall rules of the distributed firewall, and wherein the firewall flow records each comprise tuples and at least one field of network traffic data;

responsive to detecting a number of received firewall flow records exceeding a threshold value, determine whether the tuples are identical for any of the firewall flow records;

provided the tuples are not identical for any of the firewall flow records, modify the tuples for the firewall flow records by removing information from the tuples to generate modified firewall flow records to reduce granularity of the tuples, wherein the tuples are modified according to a predetermined hierarchy;

determine whether the tuples are identical for any of the modified firewall flow records; and provided the tuples are identical for any of the modified firewall flow records, coalesce the modified firewall flow records for which the tuples are identical into a single firewall flow record.

23. The computer system of claim 22, wherein the processor is further configured to:

remove a tuple from the tuples for each of the firewall flow records.

24. The computer system of claim 22, wherein the processor is further configured to:

replace a value for a tuple of the tuples with a null value for each of the firewall flow records.

25. The computer system of claim 22, wherein the processor is further configured to:

modify a portion of a tuple of the tuples for each of the firewall flow records.

26. The computer system of claim 22, wherein the processor is further configured to:

responsive to a number of the modified firewall flow records exceeding the threshold value, modify the tuples for the modified firewall flow records to generate second modified firewall flow records;

determine whether the tuples are identical for any of the second modified firewall flow records; and provided the tuples are identical for any of the second modified firewall flow records, coalesce the second modified firewall flow records for which the tuples are identical into a single firewall flow record.

27. The computer system of claim 22, wherein the processor is further configured to:

responsive to a number of the modified firewall flow records exceeding the threshold value, repeat modifying the tuples for the modified firewall flow records, determining whether the tuples are identical for any of the modified firewall flow records, and coalescing the modified firewall flow records for which the tuples are identical into a single firewall flow record.

* * * * *